(12) United States Patent
Santucci et al.

(10) Patent No.: US 12,296,679 B2
(45) Date of Patent: May 13, 2025

(54) METHOD AND SYSTEM FOR IMPARTING VOICE COMMANDS TO A MOTOR VEHICLE

(71) Applicant: PIAGGIO & C. S.P.A., Pontedera (IT)

(72) Inventors: Mario Santucci, Pontedera (IT); Onorino Di Tanna, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 312 days.

(21) Appl. No.: 17/788,372

(22) PCT Filed: Dec. 23, 2020

(86) PCT No.: PCT/IB2020/062378
§ 371 (c)(1),
(2) Date: Jun. 23, 2022

(87) PCT Pub. No.: WO2021/130689
PCT Pub. Date: Jul. 1, 2021

(65) Prior Publication Data
US 2023/0041105 A1    Feb. 9, 2023

(30) Foreign Application Priority Data
Dec. 24, 2019   (IT) .................. 102019000025528

(51) Int. Cl.
*B60K 35/10*   (2024.01)
*G10L 15/22*   (2006.01)
*G10L 15/30*   (2013.01)

(52) U.S. Cl.
CPC .............. *B60K 35/10* (2024.01); *G10L 15/22* (2013.01); *G10L 15/30* (2013.01); *B60K 2360/148* (2024.01); *G10L 2015/223* (2013.01)

(58) Field of Classification Search
CPC ... B60K 35/10; B60K 2360/148; G10L 15/22; G10L 15/30; G10L 2015/223
See application file for complete search history.

(56) References Cited

U.S. PATENT DOCUMENTS

| | | | |
|---|---|---|---|
| 9,232,069 B2 * | 1/2016 | Barrett | H04W 4/48 |
| 9,948,758 B1 * | 4/2018 | Choi | B60K 35/21 |
| 2003/0114202 A1 * | 6/2003 | Suh | H04M 1/271 |
| | | | 455/566 |
| 2006/0235688 A1 * | 10/2006 | Bicego | G10L 13/04 |
| | | | 704/E15.045 |

(Continued)

FOREIGN PATENT DOCUMENTS

| | | |
|---|---|---|
| DE | 102014016827 A1 | 5/2016 |
| JP | 05092788 A | 12/2012 |
| KR | 101579537 B1 | 12/2015 |

*Primary Examiner* — Naeem Taslim Alam
(74) *Attorney, Agent, or Firm* — McGlew and Tuttle, P.C.

(57) ABSTRACT

A method for imparting commands to a motor vehicle (1) includes a central control unit (23), at least one steered wheel (13), and a steering member (11) for acting on the steered wheel (13). The method includes a step of activating, by an interface device (21) on the steering member (11), a voice recognition function on a smartphone (5) interfaced with the central control unit (23). After the smartphone (5) has received a voice command imparted by the driver, and recognized through activation of the voice recognition function, the smartphone (5) selects by its processing unit, an instruction corresponding to the voice command received. The instruction is then executed.

20 Claims, 4 Drawing Sheets

(56) References Cited

U.S. PATENT DOCUMENTS

2017/0334500 A1* 11/2017 Jarek ...................... B60K 35/53
2018/0061410 A1    3/2018 Biswal et al.
2021/0016778 A1*  1/2021 Yashiro ................. B60W 10/04

* cited by examiner

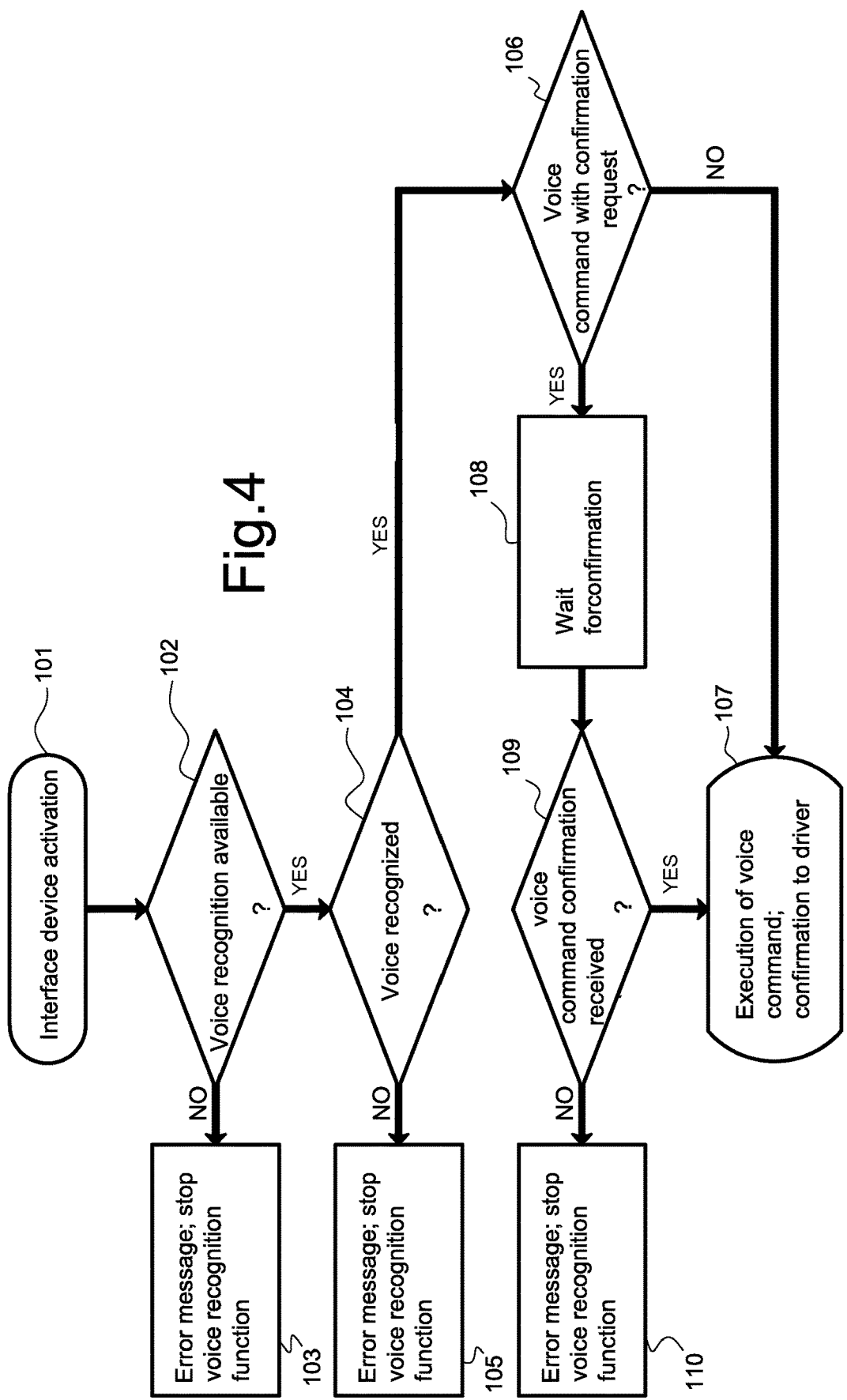

METHOD AND SYSTEM FOR IMPARTING VOICE COMMANDS TO A MOTOR VEHICLE

TECHNICAL FIELD

Disclosed herein are methods and systems to facilitate driving motor vehicles, in particular saddle-type motor vehicles, i.e., tilting motor vehicles, such as motorcycles, scooters and the like with two or three wheels.

BACKGROUND ART

In the field of saddle-type motor vehicles, such as motorcycles, mopeds, scooters and the like, with both two and three wheels, there is a constant search for solutions that increase driving comfort and safety.

DE 102014016827 discloses a method for driving motor vehicles that require the use of a helmet, in which a microphone is integrated in the helmet. The microphone is interfaced with a mobile device having computing power and data transmission and receipt functionalities, for example a smartphone, which is in connection with the helmet. Activation of the helmet causes, by means of the mobile device, activation of the motor vehicle. In this way, it is possible to start the motor vehicle without requiring to use an ignition key. In embodiments disclosed in DE102014016827 voice commands are also imparted to the motor vehicle by means of the mobile device. The smartphone comprises a voice recognition software that recognizes voice commands for the motor vehicle. To avoid sending erroneous voice commands, voice recognition of commands for the motor vehicle is activated by means of a sequence of voice instructions, or by means of an activation command placed on the helmet. In this way, while the voice recognition system is always active, sending of commands to the motor vehicle is inhibited until the driver sends a specific voice instruction that is interpreted by the voice recognition system as an activation command, after which voice commands intended to control the motor vehicle can be imparted and processed.

The system and the method disclosed in DE102014016827 have a series of functional and safety limits and drawbacks.

JP05092788 discloses a vehicle in which a voice recognition system for imparting commands to the vehicle, for example to activate the direction indicators, is integrated. Only one driver can use the voice command with which the vehicle is provided, as voice recognition must be trained. The single user that can utilize the voice commands must first set the voice commands on the vehicle storing them in the internal memory of the vehicle. Any other user wishing to use the same function of the vehicle would have to cancel the commands pre-set by the first user and then set his/her own voice commands. The voice commands of the vehicle disclosed in this prior art document can therefore only be used by one user.

Therefore, it would be useful to have a system and a method that allow voice commands to be imparted more efficiently and safely to a motor vehicle, in particular a tilting motor vehicle, or a saddle-type motor vehicle, to be driven while wearing a helmet.

SUMMARY

According to an aspect, disclosed herein is a method for imparting commands to a motor vehicle. The motor vehicle comprises: a central control unit, at least one steered wheel, and a steering member for acting on the steered wheel. The method comprises a step of activating, by means of an interface device on the steering member, a voice recognition function on a mobile device interfaced with the central control unit. For this purpose, the mobile device comprises a processing unit adapted to receive a voice command from a driver of the motor vehicle and to select an instruction from a plurality of instructions pre-set on the smartphone, based on the voice command received. The method further comprises the step of receiving, on the mobile device, a voice command. By means of the processing unit of the mobile device the instruction corresponding to the received voice command is then selected and subsequently the selected instruction is executed. In particular, the mobile device can be a smartphone. In the meaning intended here, the term smartphone can comprise in general a mobile device provided with a SIM (Subscriber Identity Module) card.

By setting the voice commands of each single user on the smartphone of the user, it is possible to allow several users, each provided with their own mobile device (smartphone), to use the same vehicle. In this way, the signal that the smartphone sends to the vehicle is always recognized as valid by the vehicle and there is no risk of the vehicle failing to recognize (or even worse, misunderstanding) the voice command imparted by the driver.

Advantageously, the mobile device is adapted to provide an Internet connection that allows user-specific voice recognition to be obtained, so as to allow the recognition of the voice of the mobile device owner.

In this way, voice recognition can be activated only when required, preventing erroneous commands from being imparted to the system and also reducing energy consumption by the smartphone. By placing the voice recognition activation interface on the steering member, typically a handlebar, the driver can activate voice recognition in complete safety, without lifting the hand off the handlebar or other steering member.

According to a further aspect, disclosed herein is a system comprising a motor vehicle having a central control unit, at least one steered wheel, and a steering member for acting on the steered wheel. The system further comprises an interface device mounted on the steering member and a mobile device, in particular a smartphone, in data exchange relationship with the central control unit of the motor vehicle. The interface device is positioned and configured so that it can be operated by the driver maintaining control of the steering member, i.e., without requiring to move the hand from its correct position of engagement with the steering member.

The smartphone is adapted to activate a voice recognition function upon receiving an activation command. The activation command is sent to the smartphone by means of operation of the interface device. The smartphone is adapted to select an instruction from a series of instructions pre-set on the smartphone, based on a voice command received by the smartphone and recognized by means of the voice recognition function.

Unlike what is disclosed, for example, in JP05092788, the system and the method of the present invention provide for the use of hardware and software resources of the mobile device (smartphone) to implement voice recognition imparted by the user. In this way, besides obtaining an advanced function for controlling the vehicle without affecting the cost thereof, the advantage is obtained of allowing more than one user to drive the same vehicle in safe conditions, using voice commands customized by the user.

BRIEF DESCRIPTION OF THE DRAWINGS

The invention will be better understood by following the description and the accompanying drawings, which illustrate a non-limiting exemplary embodiment of the invention. More in particular, in the drawing:

FIG. 4 shows a flow chart of a method for generating and executing instructions imparted by means of a voice command.

DETAILED DESCRIPTION

Figure 1:
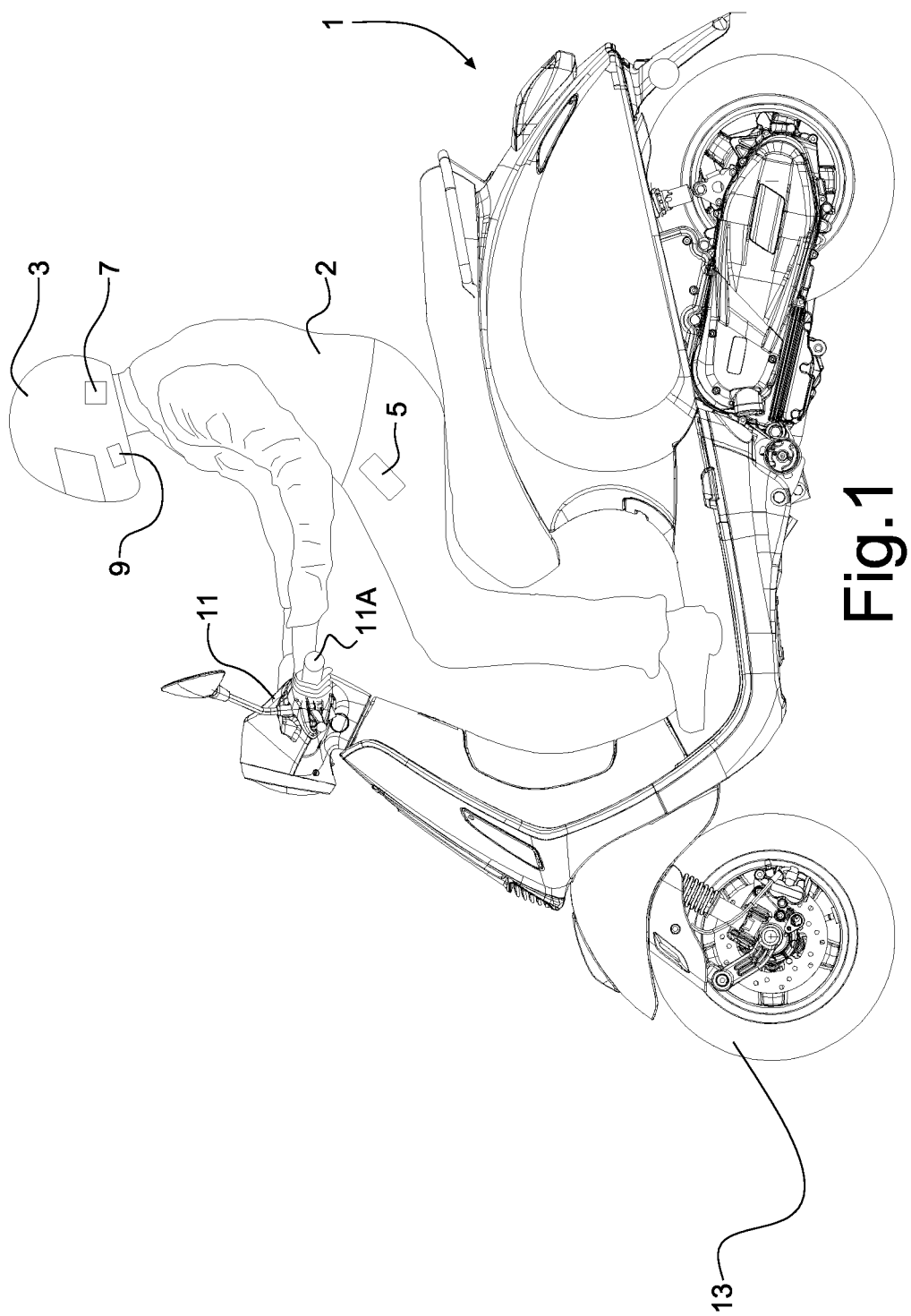
FIG. 1 shows a motor vehicle driven by a driver wearing a helmet.
Figure 2:
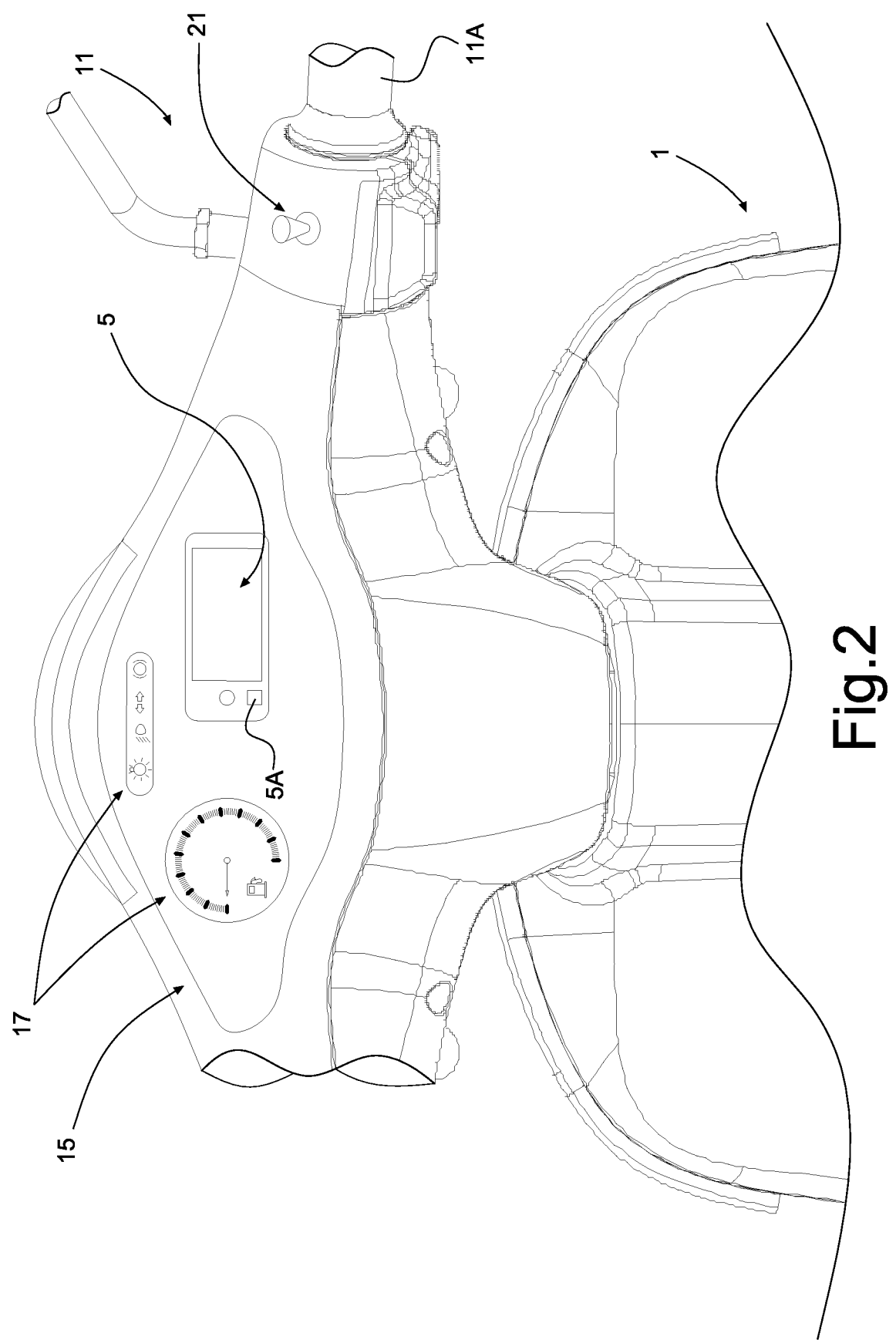
FIG. 2 shows a partial view of the handlebar of the motor vehicle of FIG. 1.

FIG. 1 schematically represents a motor vehicle 1 driven by a driver 2 wearing a helmet 3. The driver has a smartphone 5 provided with the functionalities required to implement the method described herein and to complete the system illustrated herein. In particular, the smartphone comprises a processing unit, schematically indicated with 5A in FIG. 2. The processing unit 5A provides the smartphone 5 with processing capacities, to be able to execute a voice recognition program and to store instructions and vocal prints, i.e., voice files. The smartphone is also equipped with a receiving and transmitting function, for communicating with a gateway, i.e., a central control unit placed on the motor vehicle 1. The smartphone is further equipped with functions for communicating with the driver 2, for example by means of a display and preferably by means of earpieces or another generic speaker, and with a connection to a microphone, or in general to a device for capturing sounds.

In FIG. 1 the smartphone 5 is represented carried by the driver 2, for example contained in a pocket, but it could be mounted on the handlebar of the motor vehicle 1, to be easily visible to the driver 2.

The smartphone 5 is provided with a microphone to allow the driver 2 to communicate vocally with the smartphone 5. The smartphone 5 is also provided with speakers to allow the driver 2 to listen to audible information coming from the smartphone 5. The speakers can be in the form of earpieces. In the diagram of FIG. 1 the reference 7 schematically indicates earpieces interfaced with the smartphone 5 and the reference 9 schematically indicates a microphone interfaced with the smartphone 5. The earpieces 7 (or other speakers) and the microphone 9 can be connected to the smartphone 5 with a wired connection, or preferably with a wireless connection, for example by means of a Bluetooth connection. They can be inserted into the helmet 3, or integrated therein.

The motor vehicle 1 comprises a handlebar 11, which forms a steering member to rotate a front steered wheel 13, or a pair of front steered wheels 13. The handlebar 11 is shown partially in FIG. 2 in a view from the side of the driver 2. The handlebar 11 can comprise an dashboard 15, containing the on-board instrumentation 17, for example comprising a speedometer, an odometer, warning lamps for the motor vehicle lights, and similar. In some embodiments, as illustrated schematically in FIG. 2, the dashboard can also comprise a housing for holding the smartphone 5, which in this case can be held so that its display is visible to the driver 2, for the purposes explained below.

The handlebar 11 comprises handgrips 11A that can be held by the driver 2. An interface device 21, for example in form of button, joystick or similar, the purpose of which will be explained below, is associated with one of the handgrips 11A, the right handgrip 11A in the example.

Figure 3:
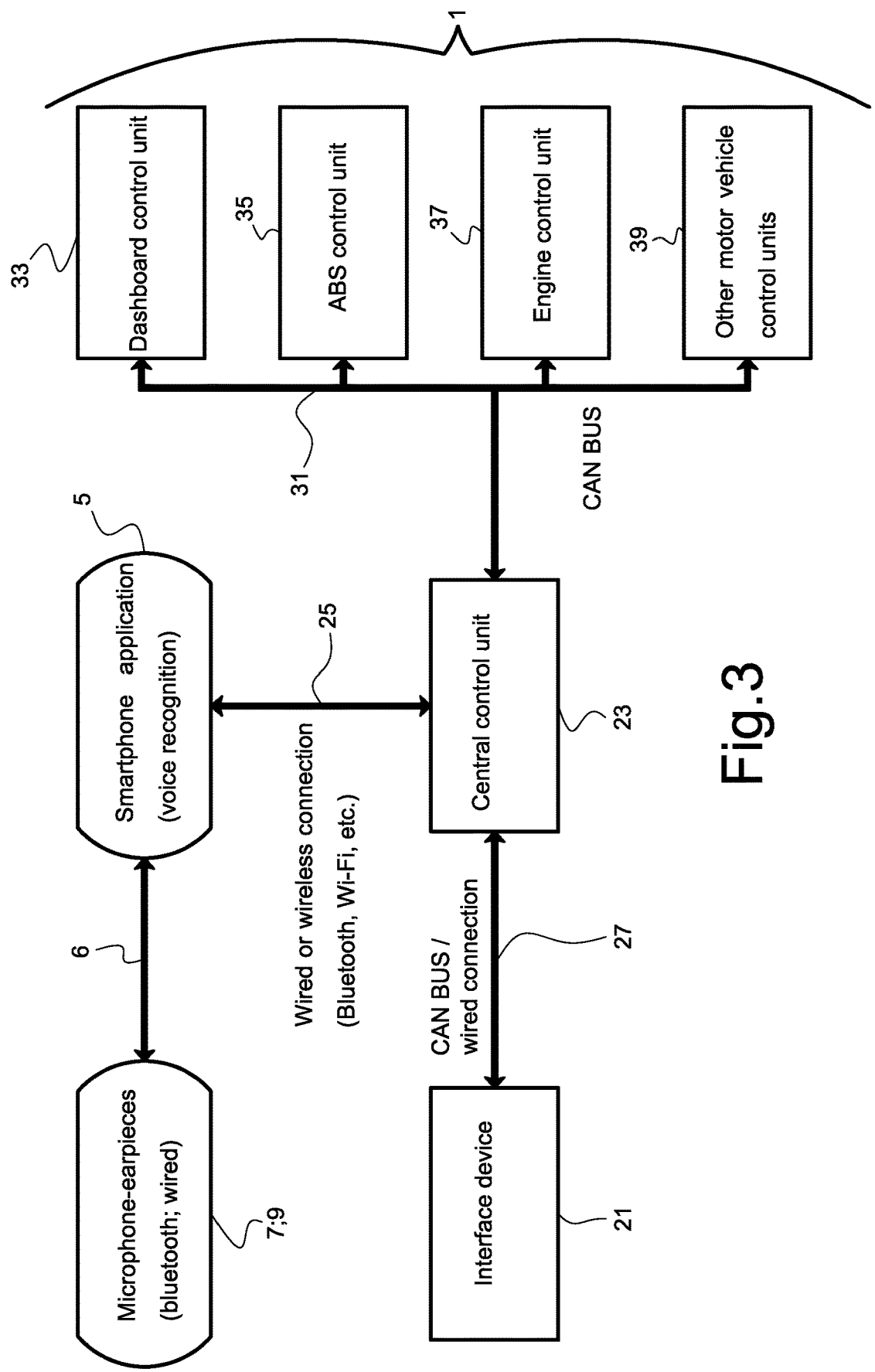
FIG. 3 shows a block diagram of components of the motor vehicle and of the smartphone interfaced therewith.

Components of the motor vehicle 1 and of the smartphone 5, useful for the comprehension of the method and of the system described herein, are represented in the form of functional blocks in FIG. 3. More in particular, FIG. 3 shows a block 5 that represents the smartphone with a voice recognition application installed thereon or belonging to its operating system. An application, the details of which will be described below and which allows voice commands, preferably customized, to be transformed into instructions for the motor vehicle 1 and optionally for the smartphone 5, is also installed on the smartphone 5.

Again in FIG. 3, the references 7; 9 indicate a block representative of the earpieces 7 and of the microphone 9, connected to the smartphone 5, by means of a connection 6. The connection of the earpieces 7 and of the microphone 9 to the smartphone 5 can be wireless or wired, as mentioned above. Moreover, the motor vehicle 1 is equipped with a central control unit 23, in data exchange relationship with the smartphone 5. The connection between the central control unit 23 of the motor vehicle 1 and the smartphone 5 is represented visually with the double arrow 25. Preferably, the connection 25 is a wireless connection, for example with Bluetooth, or Wi-Fi, technology. However, a wired connection of would also be possible.

The interface device 21 is connected with the central control unit 23 by means of a connection schematically indicated with 27. The connection 27 can be a dedicated wired connection, or can be obtained by means of the CAN-bus with which the motor vehicle 1 is equipped, which connects the central control unit 23 to a plurality of electronic controllers or electronic control units, with which the motor vehicle 1 is equipped. In FIG. 3, by way of example, the CAN Bus is indicated with 31 and connects a series of control units of the motor vehicle, such as the dashboard control unit 33, the ABS system control unit 35, the engine control unit 37, and any other control units of the motor vehicle 1, indicated as a whole and cumulatively with 39, to the central control unit 23.

As already mentioned, an application is installed on the smartphone 5, which by means of voice commands imparted by the driver 2 and recognized by a voice recognition software, activates, i.e., selects, instructions for the motor vehicle 1 and optionally also for the smartphone 5.

In some embodiments, the application installed on the smartphone 5 can provide the user with a series of instructions, each of which can be activated with a voice command, which can be customized by the driver 2. In practice, in a setting or programming step of the application, the driver 2 can call up single instructions, and associate a customized voice command with each instruction. Each single instruction, which can be pre-set in the application, when activated causes the execution of an activity by the device (motor vehicle 1; smartphone 5) for which the instruction is intended.

In a possible embodiment, the application can comprise a programming or setting mode, which can have a function for calling up and displaying single instructions, with which the user, by means of the microphone of the smartphone 5 and the voice recognition software, associates a customized voice command. In this way, voice files, i.e., vocal prints, each of which is associated with a command or instruction pre-set on the application, are stored in the smartphone 5. When the application is activated in operating mode, i.e., to allow voice commands to be received and the related instructions associated therewith to be executed, the user, i.e., the driver 2, can impart voice commands which, once recognized by the voice recognition software of the smartphone 5, activate the instruction that (during set-up) was associated with the voice command.

This operating mode allows the user to utilize voice commands, even invented or in any case customized, with which to associate one or the other of the instructions provided by the application. By way of example, two instructions can be provided for activating the right and left direction indicator. The user can choose to associate an easily memorized voice command with these two instructions, such as "turn left" and "turn right" or the shorter "left" and "right", or even verbal or sound commands, whose semantic meaning has no correlation with the associated instruction.

Besides the advantage of not requiring to memorize voice commands set by the application, but rather of choosing preferred voice commands, the user has the further advantage of not being restricted to a given language during use of the application. Therefore, the same application can be intended for users who speak different languages, even with different pronunciations or dialects. The only condition that might be useful is for the various instructions for setting or programming the application to be made available in a language selected by the user. For example, for each instruction made available by the application, the instructions written in various languages can be available in a library. The user selects the operating language, and can view the various instructions in the selected language on the display of the smartphone. Each instruction, with which customized voice commands can be associated, can alternatively be displayed graphically rather than by means of a verbal description. For example, the instruction for activation of the right and left direction indicators can be displayed with an icon that shows the motor vehicle with one or other of the two indicators flashing. Each instruction made available by the application can be loaded on the smartphone 5 when the application is downloaded and installed, although it would also be possible to select each instruction from a library or database accessible online via the Internet, for example, during programming or setting.

The aforesaid functions of the application and the related advantages can also be implemented in a system that is not provided with the voice recognition activation modes described herein, or is provided with a different voice recognition activation mode.

In some embodiments, the application can provide the user with instructions intended solely for the motor vehicle 1, i.e., instructions that activate or cause the execution of functions on the motor vehicle 1. In other embodiments, there can (also) be instructions intended for the smartphone 5, i.e., instructions the activation whereof starts the performance of functions or activities by the smartphone 5.

Typical instructions, useful for facilitating driving, intended for the smartphone 5 can cause activation of a navigator, selection of the destination, switching on high beam headlamps, choice of the dynamic set-up of the motorcycle, selection of driving modes, display of specific parameters on the dashboard of the motor vehicle, activation of complex functions of the dashboard, such as changing language, setting the clock, activating the intercom, activating the direction indicators, etc., or functions directly correlated to the application on the smartphone 5 (changing the page displayed, connection of the application to receive data, record video, record telemetry data, etc.).

Typically, the instructions intended for the motor vehicle 1 can be divided into instructions that cause an action, activity or operation on the motor vehicle 1, and into instructions that request information from the motor vehicle 1 which is communicated to the driver 2 by means of the smartphone 5.

Typical instructions that it may be useful to impart to the motor vehicle by means of voice commands can comprise: activation of the right or left direction indicator, switching on and switching off position lamps, low beam and high beam headlamps, gear change, driving mode change, automatic headlamp flashing (passing), control system settings change (traction/stability control, ABS, cruise control and similar), change of display parameters on the dashboard, distance to empty request, change of data display mode on the dashboard (e.g. day/night mode), activation/deactivation of telemetry data recording, emergency call system activation, etc.

Typical instructions that may be useful to allow the driver 2 to obtain information from the motor vehicle 1 can concern trip data or other information pertaining to the motor vehicle, such as distance to empty, both in the case of electric vehicles and in the case of vehicles with combustion engine, the average consumption or average speed of the trip or within a specific time/space interval (last hour, last 10 km, etc.), distance or time to arrival in the case of navigation in progress, weather conditions along the route or in a given destination at a given time, estimated distance to empty on arrival at destination, levels set for the various motor vehicle control systems, etc.

Some instructions can have an impact on the safety of the motor vehicle and of the driving conditions. In this case, in some embodiments the application could require the driver to confirm the instruction imparted, and failing this the instruction is not executed. For example, in the case of deactivation of the traction/stability/braking systems (or in any case of entering settings that limit their operating range), activation of the cruise control system or modification of the speed set for this system, activation of the launch control, engine map change, etc.

The system described herein can be configured and used as follows to facilitate driving of the motor vehicle 1.

The central control unit 23 can be configured to send a command for activating the voice recognition function, with which the smartphone 5 is equipped, to the smartphone 5 by means of the connection 25. Sending of the voice recognition activation command by the control unit can be triggered by means of the interface device 21 and the communication channel 27. In practice, when wishing to use a voice command, the driver acts on the interface device 21, so that the central control unit 23 transmits a voice recognition activation command to the smartphone 5 connected thereto. Once voice recognition has been activated, the driver imparts the voice command to the smartphone 5 by means of the microphone 9. The application residing in the smartphone 5 translates the voice command into the corresponding instruction.

With this arrangement it is possible to leave voice recognition of the smartphone 5 inactive when it is not needed and activate it only when required. In this way many advantages are obtained. In particular, the risk of voice commands being triggered by external noises or by the driver talking, for example while using the smartphone for a normal telephone conversation, or while talking to a passenger, is avoided.

The application of the smartphone 5 can be programmed to deactivate voice recognition immediately after having imparted the instruction corresponding to the voice command received. Otherwise, voice recognition can remain active for a predetermined period of time after activation.

The interface device 21 can also be used to impart different commands or instructions, such as activation and subsequent deactivation of voice recognition, or confirmation of the voice command imparted, for example when it can affect driving safety, as mentioned above. In this case, in practice, the interface device 21 can be used sequentially: to activate voice recognition; subsequently to allow the execution of the instruction called up by means of a voice command imparted by means of the smartphone 5, following a request for confirmation or permission by the application on the smartphone 5.

In order to use the interface device 21 to impart different commands, the interface device 21 can be provided with different components, for example a plurality of buttons, or a joystick that can be moved in different directions. In other embodiments a single button can be provided, by means of which the driver 2 can impart different commands by pressing the button once or more than once, or pressing and holding the button for different times, for example a short pressure to activate voice recognition, or a longer pressure to allow execution of the instruction imparted by means of the voice command or vice versa.

To facilitate the use of the functions described above, the driver 2 can be notified of various conditions or requests by means of an optical signal on the display of the smartphone 5 (legible for example if this is mounted on or in the dashboard of the motor vehicle 1) or preferably by means of an acoustic signal through the earpiece 7. For example, in this way the driver 2 can be notified of the following conditions or requests: correct activation of voice recognition; deactivation of voice recognition; request for permission to execute an instruction imparted by means of a voice command. A voice synthesizer can be provided for communications by the smartphone 5 (or by the central control unit 23 through the smartphone 5) to the driver 2.

As mentioned above, the instructions that the driver 2 can impart by means of voice commands can give rise not only to execution of an action on the motor vehicle 1, but these can be instructions containing a request for information from the motor vehicle 1. In this case, the information can be communicated to the driver by the central control unit 23 by means of a message on the display of the smartphone 5 and/or preferably by means of the earpiece 7. For example, the driver 2 can activate voice recognition and request information on the distance to empty of the motor vehicle 1 with a voice command. The voice command is translated by the application into an instruction directed at the control unit. This, for example by means of the control unit of the dashboard or of other on-board instrumentation, detects the distance to empty and sends the answer to the smartphone 5. The application translates the information received into a voice communication. In this way the information is provided without distracting the driver's attention from the road in order to look at the dashboard, or providing the driver with information that otherwise would not be displayed, due to the absence of specific on-board instrumentation.

FIG. 4 summarizes in a flow chart a possible embodiment of a method according to the invention. In the block 101 the driver 2 activates the interface device 21. The central control unit 23 sends a voice recognition activation command to the smartphone 5. The block 102 verifies whether voice recognition is available. This block allows the driver 2 to be informed that voice recognition is not available for any reason, for example if voice recognition requires an Internet connection and this connection is temporarily unavailable.

If voice recognition is not available, the smartphone 5 informs the driver 2 (see block 103), for example by means of a vocal error message and/or by means of a message on the display of the smartphone 5.

If voice recognition is available, the driver 2 sends the voice command by means of the microphone 9 to the smartphone 5.

The voice recognition software ascertains whether the voice is recognized (block 104). If the voice is not recognized, or if the command is not recognized, for example because it does not correspond to any of the voice tracks or files stored in the smartphone 5 and associated with respective instructions, an error message is generated (block 105) communicated by means of the earpiece 7 and/or on the display of the smartphone to the driver 2. The voice recognition function is stopped. This situation can occur, for example, if the driver 2 is inadvertently using another smartphone, or if the environment is too noisy and the voice recognition software is unable to recognize the voice, or for any other reason, for example the voice command has not been stored and/or has not been associated with a specific instruction that can be imparted to the motor vehicle 1 and/or to the smartphone 5.

If the voice is recognized, the application verifies whether the instruction activated with the voice command requires confirmation, i.e., permission to execute, by the driver 2, see block 106. If this is not required, the voice command, i.e., the instruction corresponding to the voice command, is executed, see block 107. The application can also require confirmation to be given (via earpiece 7 and/or via display of the smartphone 5) to the driver 2 of correct reception and execution of the instruction. Confirmation of the instruction represents a safety system adapted to prevent the driver 2 from inadvertently imparting a potentially hazardous instruction to the motor vehicle 1.

If the voice command activates an instruction that requires permission or confirmation by the driver, the control passes to block 108, standing by for permission or confirmation. If confirmation is given, for example by means of the interface device 21, the control passes to block 107 and executes the instruction corresponding to the voice command imparted. If confirmation of execution is not received, block 110, a message (voice or visual, as indicated above) is sent to the driver 2 and voice recognition is halted.

The invention claimed is:

1. A method for imparting commands to a motor vehicle comprising: a central control unit, at least one steered wheel, and a steering member for acting on the at least one steered wheel; wherein the method comprises the steps of:

receiving a voice command on a smartphone interfaced with the central control unit of the vehicle, wherein the smartphone comprises a processing unit configured to execute a voice recognition function and to receive the voice command from the driver of the motor vehicle and to select an instruction from a plurality of instructions pre-set in the smartphone, based on the voice command received;

selecting, by means of the processing unit of the smartphone, the instruction corresponding to the voice command received;

executing the selected instruction, wherein the selected instruction controls driving of the motor vehicle;

activating, by means of an interface device positioned on the steering member, the voice recognition function on the smartphone, wherein the step of activating the voice recognition function comprises the steps of:

sending to the central control unit of the motor vehicle, by means of the interface device, a request for activation of the voice recognition function; and in response to said request for activation of the voice recognition function, sending to the smartphone, by means of the central control unit of the motor vehicle, a command for activation of the voice recognition function on the smartphone.

2. The method of claim 1, wherein the interface device is placed on a handlebar of the motor vehicle.

3. The method of claim 1, wherein the selected instruction is executed on the smartphone.

4. The method of claim 1, wherein the selected instruction is transmitted from the smartphone to the motor vehicle and wherein the selected instruction is executed on the motor vehicle.

5. The method of claim 4, wherein said instruction comprises at least one of: an instruction for executing a function on the motor vehicle; a request for sending information from the motor vehicle to the smartphone.

6. The method of claim 1, wherein the smartphone is adapted to generate confirmation that voice recognition has been activated.

7. The method of claim 6, wherein said confirmation comprises one or more of the following: a vocal or acoustic signal through a speaker interfaced with the smartphone; an optical or visual signal on a display of the smartphone or interfaced therewith.

8. The method of claim 1, comprising the step of asking the driver, by means of the smartphone, for confirmation of the execution of the selected instruction; and wherein the selected instruction is executed only if said confirmation is provided by the driver.

9. The method of claim 1, wherein the smartphone is adapted to associate, in a programming step, a customized voice command with an instruction string.

10. A system comprising:

a motor vehicle comprising: a central control unit, at least one steered wheel, and a steering member to act on the steered wheel; and a smartphone in a data exchange relationship with the central control unit of the motor vehicle, wherein the smartphone has a voice recognition function and is configured to select an instruction from a series of instructions preset on the smartphone based on a voice command received by the smartphone and recognized by means of the voice recognition function, wherein the selected instruction controls driving of the motor vehicle;

wherein the smartphone is adapted to activate the voice recognition function upon receiving an activation command, the sending of which is controlled by means of an interface device positioned on the steering member, wherein activation of the voice recognition function is achieved by:

sending to the central control unit of the motor vehicle, by means of the interface device, a request for activation of the voice recognition function, and by sending to the smartphone, by means of the central control unit of the motor vehicle, a command for activation of the voice recognition function on the smartphone.

11. The system of claim 10, wherein the smartphone is adapted to associate with a plurality of voice commands a corresponding plurality of preset instructions; and wherein each of said instructions can be one of: an instruction executable on the smartphone; and an instruction executable on the motor vehicle.

12. The system of claim 10, wherein at least one of said preset instructions comprises at least one of: a request for information to be sent from the motor vehicle to the smartphone, an instruction for executing a function on the motor vehicle, an instruction for executing a function on the smartphone.

13. The system of claim 10, wherein at least one of said smartphone and said central control unit is configured to request confirmation of the execution of the selected instruction by means of a voice command.

14. The system of claim 10, wherein the smartphone is connected to the central control unit of the motor vehicle by means of a wireless connection, in particular a Bluetooth or Wi-Fi connection.

15. The system of claim 13, wherein said confirmation of the execution is activated by means of the interface device.

16. The system of claim 10, wherein the interface device is placed on a handlebar of the motor vehicle.

17. The system of claim 16, wherein the smartphone is adapted to associate with a plurality of voice commands a corresponding plurality of preset instructions; and wherein each of said instructions can be one of: an instruction executable on the smartphone; and an instruction executable on the motor vehicle.

18. The system of claim 16, wherein at least one of said pre-set instructions comprises at least one of: a request for information to be sent from the motor vehicle to the smartphone, an instruction for executing a function on the motor vehicle, an instruction for executing a function on the smartphone.

19. The system of claim 16, wherein at least one of said smartphone and said central control unit is configured to request confirmation of the execution of a selected instruction by means of a voice command.

20. The method of claim 8, wherein said confirmation is provided by means of the interface device.

* * * * *